(12) United States Patent
Yu

(10) Patent No.: US 9,122,458 B2
(45) Date of Patent: Sep. 1, 2015

(54) REMOVABLE CAGE AND ELECTRONIC APPARATUS

(71) Applicant: Wistron Corporation, New Taipei (TW)

(72) Inventor: Ching-Jen Yu, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 76 days.

(21) Appl. No.: 14/188,708

(22) Filed: Feb. 25, 2014

(65) Prior Publication Data

US 2015/0085451 A1    Mar. 26, 2015

(30) Foreign Application Priority Data

Sep. 23, 2013   (TW) .............................. 102134144 A

(51) Int. Cl.
*G06F 1/16*     (2006.01)
*H05K 5/00*     (2006.01)
*H05K 7/00*     (2006.01)
*H05K 7/14*     (2006.01)
*H05K 7/18*     (2006.01)
*A47B 95/02*    (2006.01)
*G06F 1/18*     (2006.01)

(52) U.S. Cl.
CPC ...................................... *G06F 1/185* (2013.01)

(58) Field of Classification Search
CPC .............................. H05K 5/0221; H05K 7/02
See application file for complete search history.

(56) References Cited

U.S. PATENT DOCUMENTS 5,481,431 A * 1/1996 Siahpolo et al. ......... 361/679.31
5,588,728 A * 12/1996 Eldridge et al. ........... 312/332.1
5,641,296 A * 6/1997 Larabell et al. ............... 439/342
5,831,821 A * 11/1998 Scholder et al. ......... 361/679.32
6,532,150 B2 * 3/2003 Sivertsen et al. ........ 361/679.33
6,580,617 B2 * 6/2003 Kao .............................. 361/759
6,625,014 B1 * 9/2003 Tucker et al. ............ 361/679.34
7,126,817 B2 * 10/2006 Li ............................. 361/679.37
7,400,936 B2 * 7/2008 Chang ............................ 700/90
7,441,744 B2 * 10/2008 Chen et al. .................... 248/694
7,771,218 B2 * 8/2010 Jaramillo et al. ............. 439/157
8,089,770 B2 * 1/2012 Olesiewicz et al. ........... 361/752
2004/0017650 A1 * 1/2004 Liu et al. ....................... 361/685
2005/0146846 A1 * 7/2005 Chen et al. .................... 361/683

(Continued)

FOREIGN PATENT DOCUMENTS

TW          545681       8/2003
TW         M245717      10/2004
TW         M401802       4/2011

*Primary Examiner* — Hoa C Nguyen
*Assistant Examiner* — Xanthia C Cunningham
(74) *Attorney, Agent, or Firm* — Winston Hsu; Scott Margo

(57) ABSTRACT

An electronic apparatus includes an apparatus casing and a removable cage. The removable cage includes a cage body, a carry handle, and a locking mechanism disposed on the cage body. The carry handle includes a pivotally-connecting part, pivotally connected to the cage body, a handle body, and a pushing part. The handle body and the pushing part are oppositely connected to the pivotally-connecting part. The locking mechanism includes a latching part and an unlocking part. The latching part can be engaged into a lock slot of the pivotally-connecting part so that the carry handle is fixed relative to the cage body for carrying the cage body. The unlocking part can be driven to disengage the latching part from the lock slot. By the lever rule, the carry handle can move the cage body into the apparatus casing further or move the cage body reversely to depart from the apparatus casing.

16 Claims, 9 Drawing Sheets

(56) References Cited

U.S. PATENT DOCUMENTS

| | | |
|---|---|---|
| 2006/0171110 A1* | 8/2006 | Li .................................. 361/685 |
| 2009/0225527 A1* | 9/2009 | Olesiewicz et al. ........... 361/802 |
| 2009/0273901 A1* | 11/2009 | Jaramillo et al. ........ 361/679.58 |
| 2011/0289521 A1* | 11/2011 | Chen ............................. 720/601 |
| 2012/0087084 A1* | 4/2012 | Nguyen et al. ........... 361/679.37 |

* cited by examiner

REMOVABLE CAGE AND ELECTRONIC APPARATUS

BACKGROUND OF THE INVENTION

1. Field of the Invention

The invention relates to a removable cage and an electronic apparatus, and especially relates to a removable cage for carrying an exchangeable electronic module and an electronic apparatus having the removable cage.

2. Description of the Prior Art

Conventional electronic equipment is usually equipped with exchangeable electronic modules such as expansion cards. A user can install, exchange, or remove them according to different requirements. When the quantity of electronic components to be installed, exchanged, or removed is large, the volume thereof is big, or the weight thereof is heavy, such operation is quite inconvenient. At present, there are electronic modules available. Each electronic module carries a plurality of electronic components by a bracket is available for installing or removing the electronic components together. Some of the brackets have a carry handle for users to carry and apply a force thereto during an extraction. However, during an insertion, because the carry handle is rotatable relative to the bracket freely, the user needs to directly force the main body of the bracket. In such case, the freely-rotatable carry handle induces inconvenience in a certain degree in an insertion operation. Furthermore, whether the bracket has been really inserted into electronic equipment especially regarding the connection of the electronic connectors usually needs starting the electronic equipment for verifying.

SUMMARY OF THE INVENTION

An objective of the invention is to provide a removable cage, which uses a locking mechanism to lock or unlock a carry handle, so that when the carry handle is locked, it is convenient to carry and place the removable cage, and when the carry handle is unlocked, it is convenient to insert or extract the removable cage effectively.

The removable cage of the invention is capable of being installed into an apparatus casing. The apparatus casing includes a first constraint part and a second constraint part. The removable cage includes a cage body, a carry handle, and a locking mechanism. The cage body is used for carrying an electronic module. The carry handle is used for carrying the cage body. The carry handle includes a handle body, a pivotally-connecting part, and a pushing part. The handle body and the pushing part are oppositely connected to the pivotally-connecting part. The pivotally-connecting part is pivotally connected to the cage body. The pivotally-connecting part has a lock slot. The locking mechanism is disposed on the cage body and includes a latching part and an unlocking part. The latching part is capable of being engaged into the lock slot so that the carry handle is fixed relative to the cage body for carrying the cage body. The unlocking part is dynamically connected to the latching part and is capable of being driven to disengage the latching part from the lock slot. Therein, when the removable cage is placed into the apparatus casing in an insertion direction, the unlocking part is driven to disengage the latching part from the lock slot so that the carry handle is capable of rotating toward a side of the cage body in a rotation direction and the pushing part pushes against the first constraint part. The carry handle pivots about a fulcrum, where the pushing part contacts the first constraint part, to move the cage body in the insertion direction further by the pivotally-connecting part. Furthermore, when the carry handle rotates away from the cage body in a direction reverse to the rotation direction, the pushing part departs from the first constraint part and pushes against the second constraint part. The carry handle pivots about a fulcrum, where the pushing part contacts the second constraint part, to move the cage body in a direction reverse to the insertion direction by the pivotally-connecting part.

Another objective of the invention is to provide an electronic apparatus, which uses the removable cage of the invention conducive to installing and removing an electronic module carried by the removable cage efficiently.

The electronic apparatus of the invention includes an apparatus casing, an electronic module, and a removable cage. The apparatus casing has an accommodating space, a first constraint part, and a second constraint part. The removable cage includes a cage body, a carry handle, and a locking mechanism. The cage body is used for carrying the electronic module. The carry handle is used for carrying the cage body. The carry handle includes a handle body, a pivotally-connecting part, and a pushing part. The handle body and the pushing part are oppositely connected to the pivotally-connecting part. The pivotally-connecting part is pivotally connected to the cage body. The pivotally-connecting part has a lock slot. The locking mechanism is disposed on the cage body and includes a latching part and an unlocking part. The latching part is capable of being engaged into the lock slot so that the carry handle is fixed relative to the cage body for carrying the cage body. The unlocking part is dynamically connected to the latching part and is capable of being driven to disengage the latching part from the lock slot. Therein, when the removable cage is placed into the accommodating space in an insertion direction, the unlocking part is driven to disengage the latching part from the lock slot so that the carry handle is capable of rotating toward a side of the cage body in a rotation direction and the pushing part pushes against the first constraint part. The carry handle pivots about a fulcrum, where the pushing part contacts the first constraint part, to move the cage body in the insertion direction further by the pivotally-connecting part. Furthermore, when the carry handle rotates away from the cage body in a direction reverse to the rotation direction, the pushing part departs from the first constraint part and pushes against the second constraint part. The carry handle pivots about a fulcrum, where the pushing part contacts the second constraint part, to move the cage body in a direction reverse to the insertion direction by the pivotally-connecting part.

Compared with the prior art, the carry handle of the removable cage of the invention is fixed by the locking mechanism so as not to be arbitrarily rotated, which avoids troubles with the operation of placing the removable cage. Besides, a user can also apply a force through the carry handle at the same time, which is more conducive to placing the removable cage to the apparatus casing steadily. Furthermore, when the removable cage is placed into the apparatus casing, the unlocking part is driven to disengage the latching part from the lock slot. By the principle of levers, the carry handle moves the cage body into the apparatus casing further so as to really place the removable cage, which ensures that the electronic module has been electrically connected stably. Further, when the removable cage is required to be extracted from the apparatus casing, also by the principle of levers, the carry handle moves the cage body reversely to depart from the apparatus casing. In addition, the locking mechanism can use a resilient part connected to the cage body and the latching part. When the carry handle rotates upward relative to the apparatus casing and the unlocking part is not under a driving operation, the resilient part drives the latching part to engage into the lock slot so that the carry handle is fixed relative to the cage body, which achieves an effect of automatically fixing.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
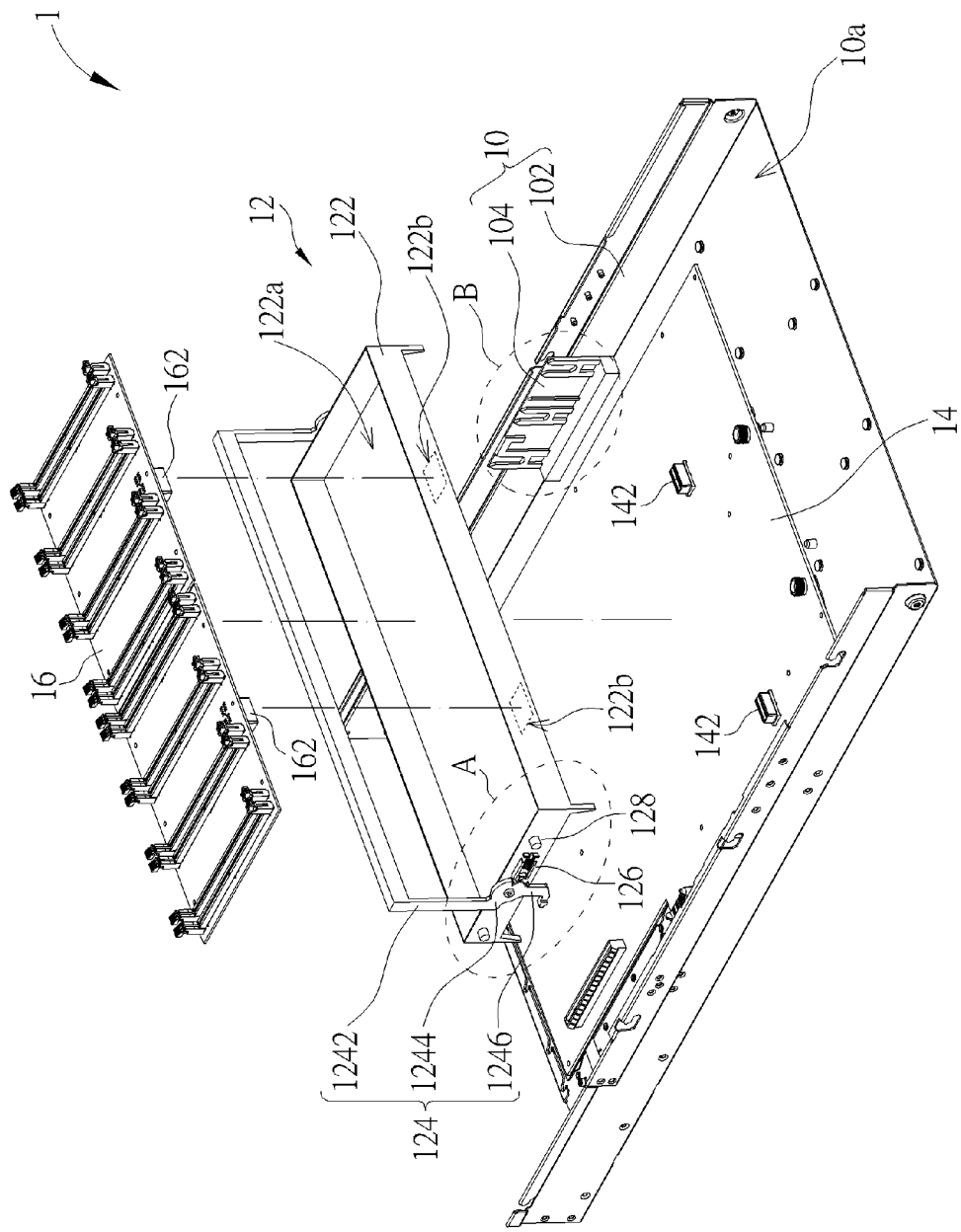
FIG. 1 is a partially-exploded view of an electronic apparatus of a preferred embodiment according to the invention.

Please refer to FIG. 1, which is a partially-exploded view of an electronic apparatus 1 of a preferred embodiment according to the invention. The electronic apparatus 1 includes an apparatus casing 10, a removable cage 12, a processing module 14, and an electronic module 16. The processing module 14 is disposed in the apparatus casing 10. The removable cage 12 carries the electronic module 16 and is capable of being installed into the apparatus casing 10 in an insertion direction D1 (for example not limited to a vertical direction), so that the electronic module 16 is capable of engaging with the processing module 14 firmly. For simple description of a joining of the removable cage 12 with the apparatus casing 10, the apparatus casing 10 is shown with partial structure in FIG. 1.

Figure 2:
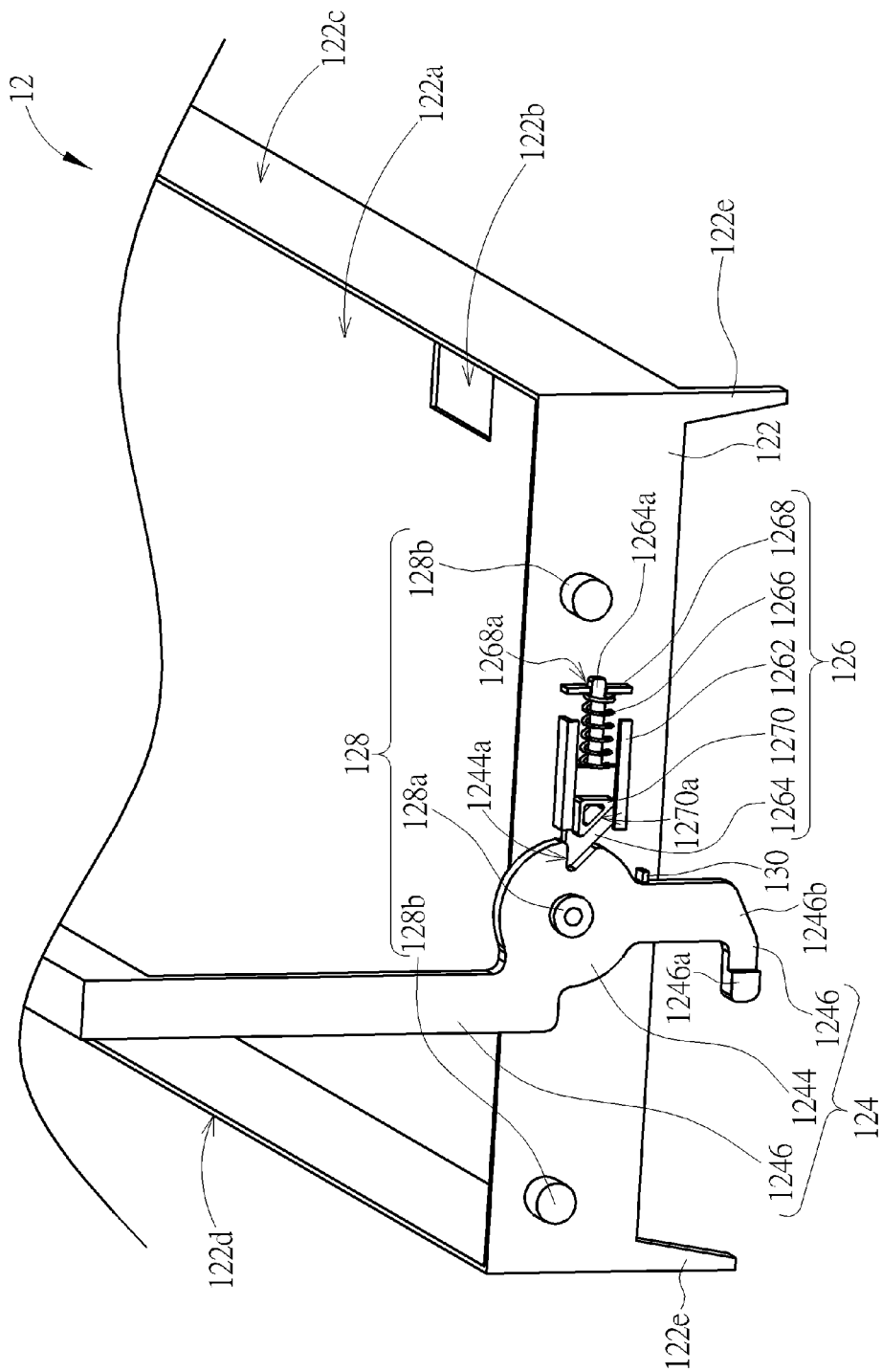
FIG. 2 is an enlarged view of a part of a removable cage of the electronic apparatus marked with a circle A in FIG. 1.
Figure 3:
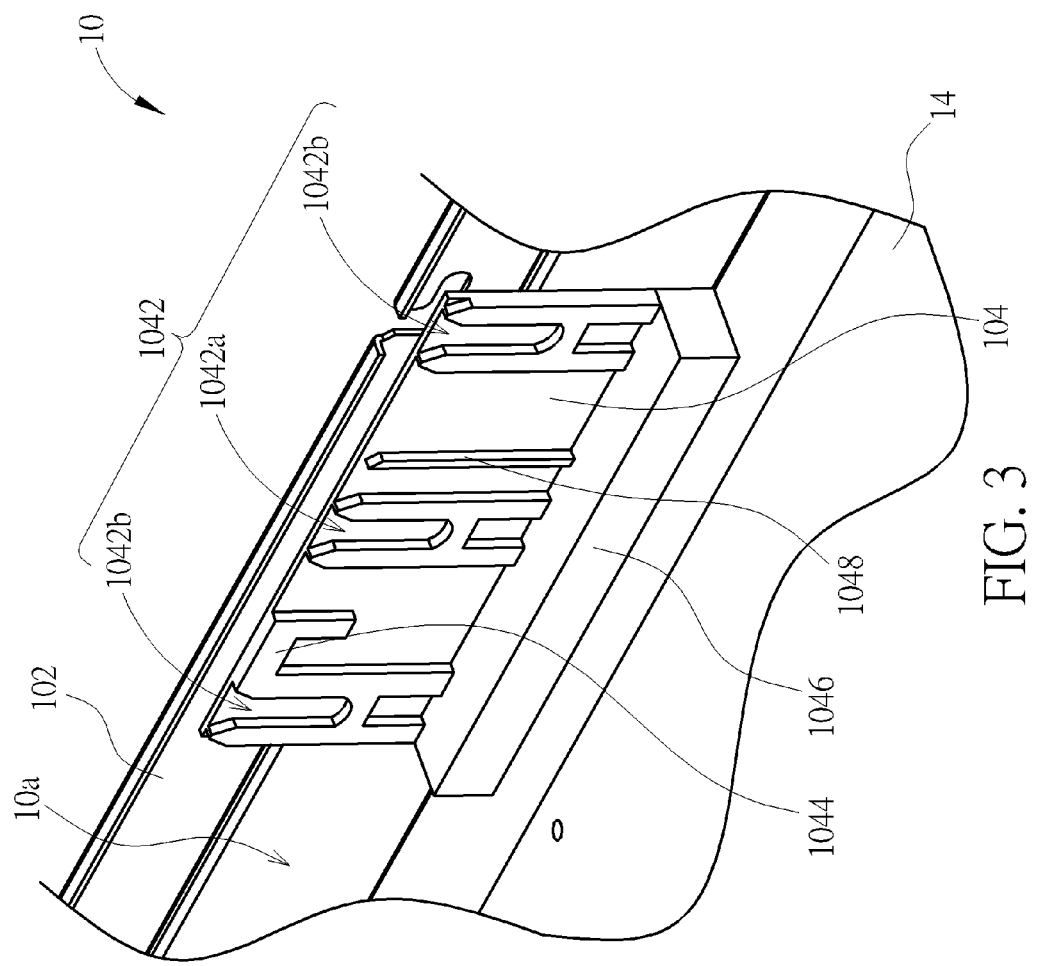
FIG. 3 is an enlarged view of a part of an apparatus casing of the electronic apparatus marked with a circle B in FIG. 1.

Please also refer to FIG. 2 and FIG. 3. FIG. 2 is an enlarged view of a part of the removable cage 12 marked with a circle A in FIG. 1. FIG. 3 is an enlarged view of a part of the apparatus casing 10 marked with a circle B in FIG. 1. For further description, the removable cage 12 includes a cage body 122, a carry handle 124, two locking mechanisms 126, and two first guiding structures 128. The cage body 122 has an accommodating space 122a and two through holes 122b formed through on a bottom of the accommodating space 122a. The carry handle 124 includes a handle body 1242, two pivotally-connecting parts 1244, and two pushing parts 1246. The handle body 1242 presents an n-shaped profile. Two end portions of the handle body 1242 are connected to the pivotally-connecting parts 1244 respectively. The pushing parts 1246 are connected to the pivotally-connecting parts 1244 opposite to the two end portions of the handle body 1242 respectively. The pivotally-connecting parts 1244 are pivotally connected to two sides of the cage body 122 respectively. The pivotally-connecting part 1244 has a lock slot 1244a. Thereby, the carry handle 124 is pivotally connected to the two sides of the cage body 122 for conveniently carrying the cage body 122. The locking mechanisms 126 are disposed on the two sides of the cage body 122 respectively. The locking mechanism 126 includes a slide structure 1262, a latching part 1264, a resilient part 1266 (e.g. a spring), a constraint wall 1268, and an unlocking part 1270. The slide structure 1262 and the constraint wall 1268 are disposed on the cage body 122. The slide structure 1262 forms a slide slot by two L-shaped bent structural parts. The latching part 1264 is slidably disposed in the slide slot. The resilient part 1266 pushes against and between the latching part 1264 and the constraint wall 1268 for applying a resilient driving force to the latching part 1264 for driving the latching part 1264 to move toward the pivotally-connecting part 1244 so as to be engaged into the lock slot 1244a, so that the carry handle 124 is fixed relative to the cage body 122 for carrying the cage body 122. When the latching part 1264 is engaged into the lock slot 1244a, the carry handle 124 is fixed relative to the cage body 122 for carrying the cage body 122. The unlocking part 1270 is fixed on the latching part 1264. When the unlocking part 1270 moves, the latching part 1264 also moves therewith, so as to achieve the purpose of locking or unlocking the carry handle 124. The first guiding structure 128 is disposed to protrude out of the cage body 122. The first guiding structure 128 includes three guide bosses 128a and 128b. The guide boss 128a is disposed directly where the pivotally-connecting part 1244 and the cage body 122 are pivotally connected. The guide boss 128b is disposed directly on the cage body 122. Therein, the guide boss 128a can be realized by a pivotal shaft which is used for pivotally connecting the pivotally-connecting part 1244 and the cage body 122. By the interaction of the guide bosses 128a and 128b with a guiding structure of the apparatus casing 10, the removable cage 12 is capable of being guided into the apparatus casing 10 steadily. In addition, the removable cage 12 further includes a limitation structure 130 disposed on the cage body 122 for constraining the carry handle 124 to be able to rotate only within a rotation range relative to the cage body 122. From the view point of FIG. 2, the carry handle 124 (or the handle body 1242) can only rotate at the right side of the cage body 122. In another aspect, when the latching part 1264 is disengaged from the lock slot 1244a, the limitation structure 130 is capable of blocking the carry handle 124 for preventing the carry handle 124 from rotating anticlockwise.

It is added that in the embodiment, the latching part 1264 includes a positioning boss 1264a. The constraint wall 1268 has a notch 1268a for the positioning boss 1264a to pass through, so that during a sliding of the latching part 1264, the resilient part 1266 is always sleeved on the positioning boss 1264a, so as to enhance the action stability of the resilient part 1266; however, the invention is not limited thereto. Furthermore, in practice, any structure capable of producing resilient force can be used as the resilient part to be connected to the cage body 122 and the latching part 1264. Such structure also can provide a resilient driving force to the latching part 1264 for driving the latching part 1264 to move toward the pivotally-connecting part 1244 so as to be engaged into the lock slot 1244a. Hence, the invention is not limited to the resilient part 1266 mentioned above. In addition, the unlocking part 1270 also can be dynamically connected to the latching part 1264 in other ways (e.g. through a linkage mechanism) for being driven to disengage the latching part 1264 from the lock slot 1244a.

In the embodiment, the electronic module 16 is a memory expansion module. There can be many memory modules (not shown in the figures) inserted onto the memory expansion module. However, the invention is not limited thereto. The electronic module 16 has two electronic connectors 162. The electronic module 16 is disposed in the accommodating space 122a (e.g. by screws or other engagement structures), which facilitates carrying the electronic module 16 by the cage body 122. Thereby, a user can easily transport the electronic module 16 by use of the removable cage 12. Furthermore, the electronic connectors 162 pass through the through holes 122b to protrude out of a bottom of the cage body 122, so that when the removable cage 12 is installed into the apparatus casing 10, the electronic connector 162 is capable of being engaged with an electronic connector 142 of the processing module 14 for achieving the purpose of electrically connecting the electronic module 16 with the processing module 14.

The apparatus casing 10 includes a metal sheet casing 102 and two side plates 104. The metal sheet casing 102 forms an accommodating space 10a for accommodating the removable cage 12, the processing module 14, and other electronic components. The side plate 104 is disposed in the accommodating space 10a and fixed on a side wall of the metal sheet casing 102. The side plate 104 includes a second guiding structure 1042, a first constraint part 1044, a second constraint part 1046, and an interference part 1048. The second guiding structure 1042 includes three slide slots 1042a and 1042b corresponding the guide bosses 128a and 128b respectively and extending in the insertion direction D1 with openings upward. The first constraint part 1044 is protrusively disposed at an upper side of the side plate 104. The second constraint part 1046 is disposed at a lower side of the side plate 104. In the embodiment, the interference part 1048 is a rib extending in the insertion direction D1, but the invention is not limited thereto. In addition, in practice, the whole or a part of the side plate 104 can be formed directly by the metal sheet casing 102 (e.g. by press forming); however, the invention is not limited to the above practice by decomposing into parts.

Figure 4:
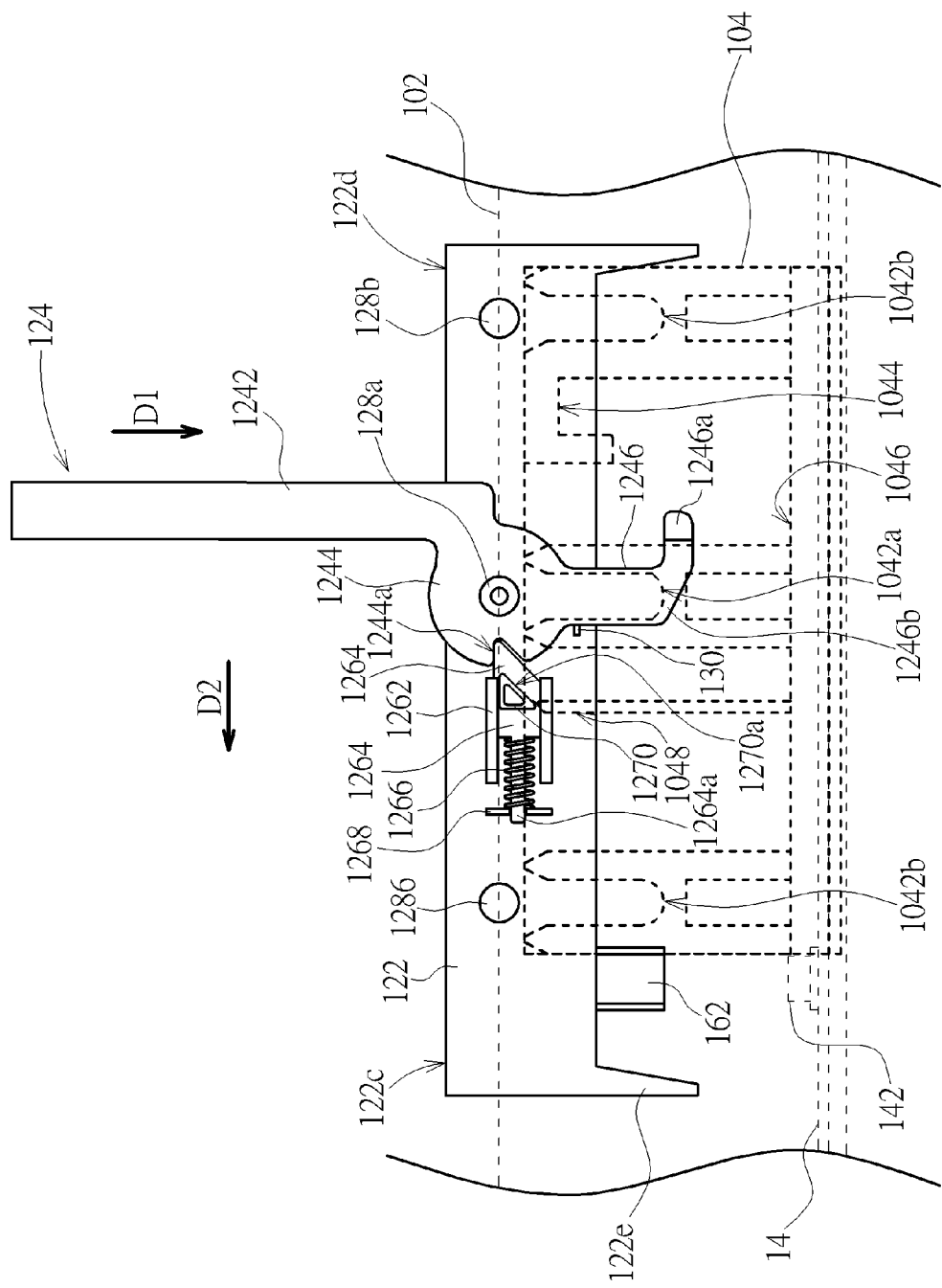
FIGS. 4 through 9 are successive action diagrams illustrating the removable cage being installed in the apparatus casing in FIG. 1.

Please refer to FIGS. 4 through 9, which are successive action diagrams illustrating the removable cage 12 being installed in the apparatus casing 10. For simple description and drawings, the installation operation is based on the side-view point of the removable cage 12. The main profile of the apparatus casing 10 is shown by dashed lines. The structural profile of the side plate 104 is shown by dashed bold lines. In the embodiment, the locking mechanism 126 is provided under an automatic locking design (i.e. the resilient part 1266 driving the latching part 1264 to be engaged into the lock slot 1244a), so before the locking mechanism 126 is unlocked, the carry handle 124 can be maintained to be vertically and fixedly disposed relative to the cage body 122. Thereby, the user can easily carry the removable cage 12 and initially place the removable cage 12 into the apparatus casing 10 in the insertion direction D1, as shown by FIG. 4. Furthermore, the interference part 1048 is located at a movement path of the unlocking part 1270, so when the cage body 122 is initially placed into the apparatus casing 10 in the insertion direction D1, the interference part 1048 pushes against an oblique plane 1270a of the unlocking part 1270 to drive the unlocking part 1270 to move in a sliding direction D2 (i.e. the direction the slide structure 1262 extending) so that the latching part 1264 disengages from the lock slot 1244a gradually.

Figure 5:
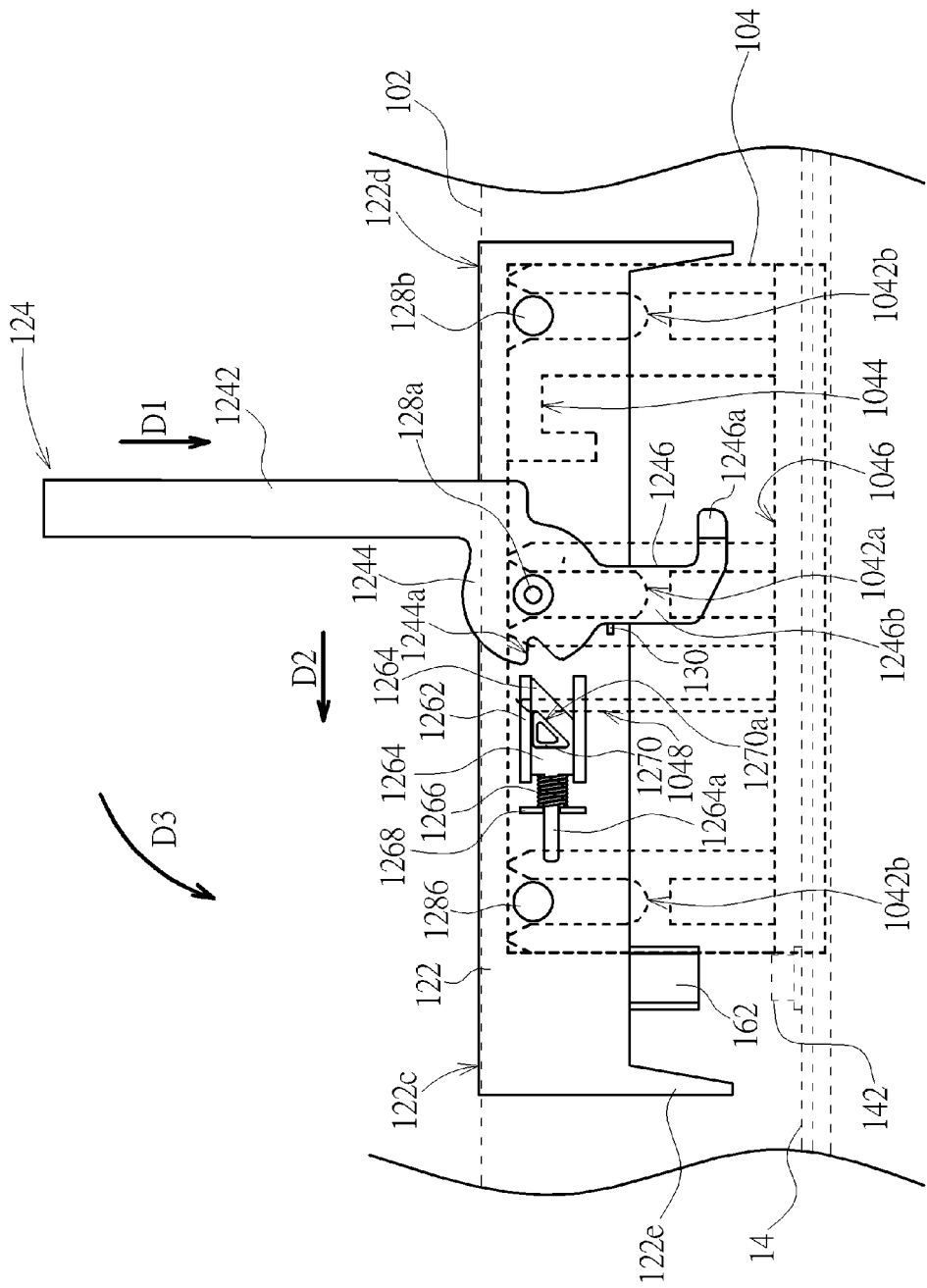
Figure 6:
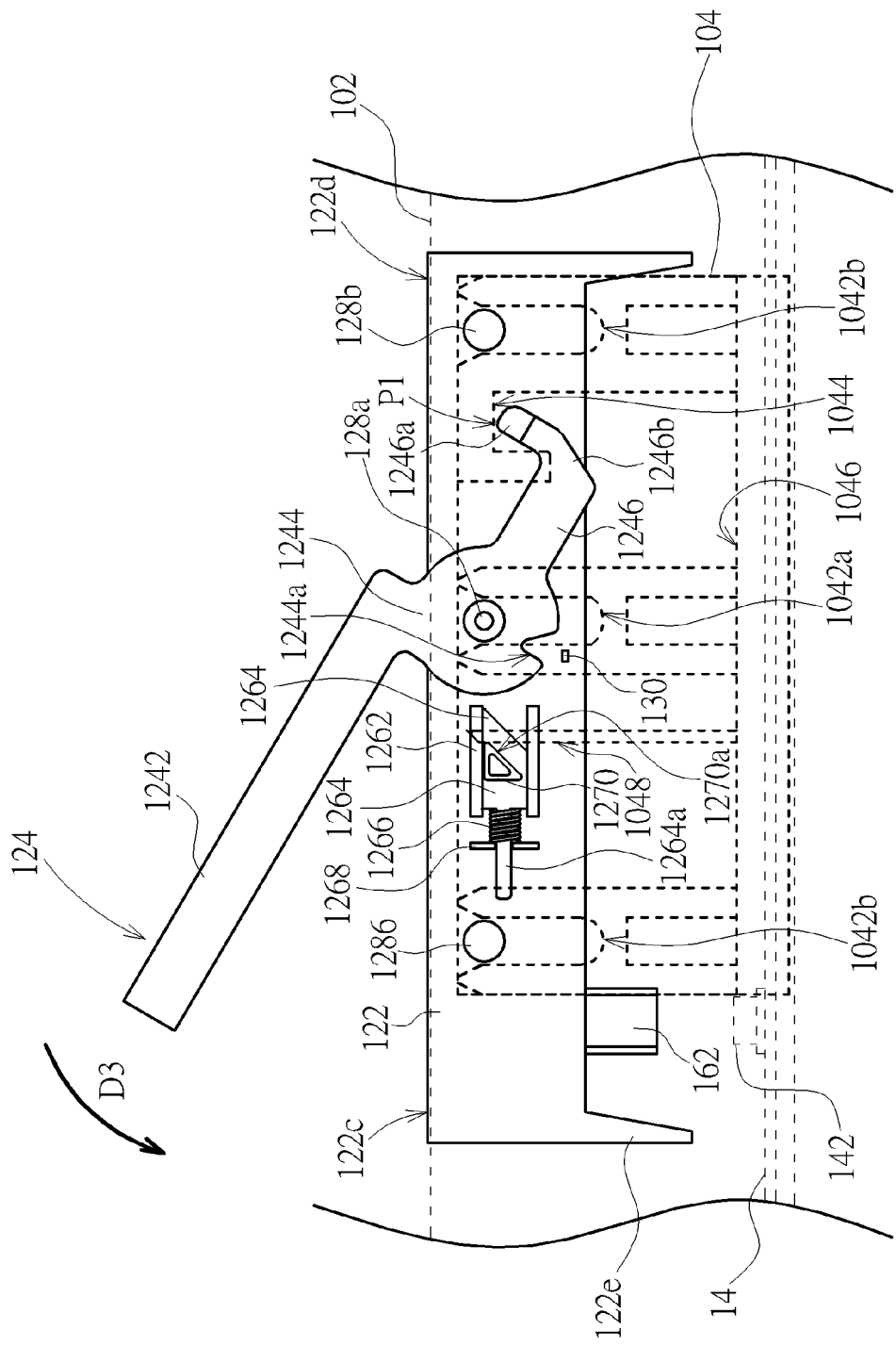
Figure 7:
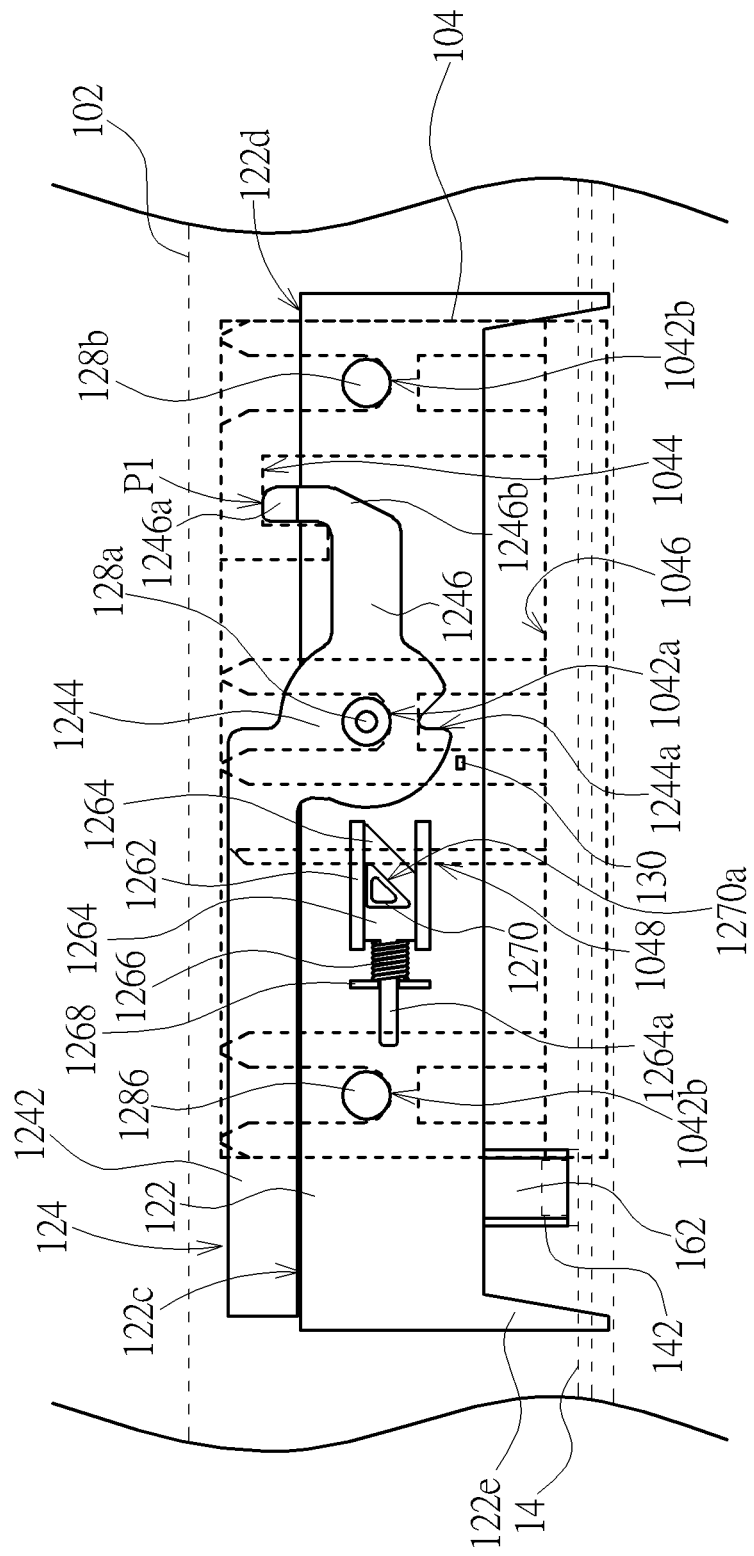

Afterwards, the first guiding structure 128 is engaged with the second guiding structure 1042; that is, the guide bosses 128a and 128b slide into the slide slots 1042a and 1042b respectively. As shown by FIG. 5, because of the guiding effect of the second guiding structure 1042 to the first guiding structure 128, during the removable cage 12 entering the accommodating space 10a, the cage body 122 keeps horizontal so that an accurate alignment of the electronic connectors 162 and 142 also can be maintained so as to ensure that the effective engagement of the electronic connectors 162 and 142 is performed. In the embodiment, after the guide bosses 128a and 128b entirely slide into the slide slots 1042a and 1042b, the latching part 1264 has been entirely disengaged from the lock slot 1244a by linkage driven by the unlocking part 1270, so that the pivotally-connecting part 1244 (or the carry handle 124) is capable of rotating relative to the cage body 122. Under the constraint by the limitation structure 130, the user can only rotate the carry handle 124 toward a side 122c of the cage body 122 in a rotation direction D3 (i.e. anticlockwise direction). That is, the limitation structure 130 is capable of blocking the carry handle 124 for preventing the carry handle 124 from rotating toward another side 122d of the cage body 122 in a direction reverse to the rotation direction D3. The carry handle 124 is capable of be rotated until the pushing part 1246 (or a protrusive front end portion 1246a) pushes against the first constraint part 1044, as shown by FIG. 6. At this moment, the user can continue rotate the carry handle 124 in the rotation direction D3. The carry handle 124 pivots about a contact point P1 as a fulcrum, where the pushing part 1246 contacts the first constraint part 1044, to move the cage body 122 in the insertion direction D1 further (i.e. moving into the accommodating space 10a further) by the pivotally-connecting part 1244. The guide bosses 128a and 128b continue sliding in the slide slots 1042a and 1042b respectively until the handle body 1242 is blocked by the side 122c of the cage body 122, as shown by FIG. 7. At this moment, the removable cage 12 has been installed in the apparatus casing 10, and the electronic connectors 162 and 142 are electrically connected effectively. The electronic apparatus 1 is ready to run normally.

It is added that during the above rotating of the carry handle 124, because of the guiding effect between the first guiding structure 128 and the second guiding structure 1042, the electronic connectors 162 and 142 are always maintained precisely aligning with each other. When the carry handle 124 has been rotated completely, the electronic connectors 162 and 142 are also engaged completely. Furthermore, the carry handle 124 provides lever effect during rotating, so the user can really engage the electronic connectors 162 and 142 with each other without much effort, which solves the engagement problem in the prior art. In addition, in the embodiment, the first constraint part 1044 presents a groove structure, which enhances the stability of the pushing part 1246 contacting the first constraint part 1044; however, the invention is not limited thereto.

Figure 8:
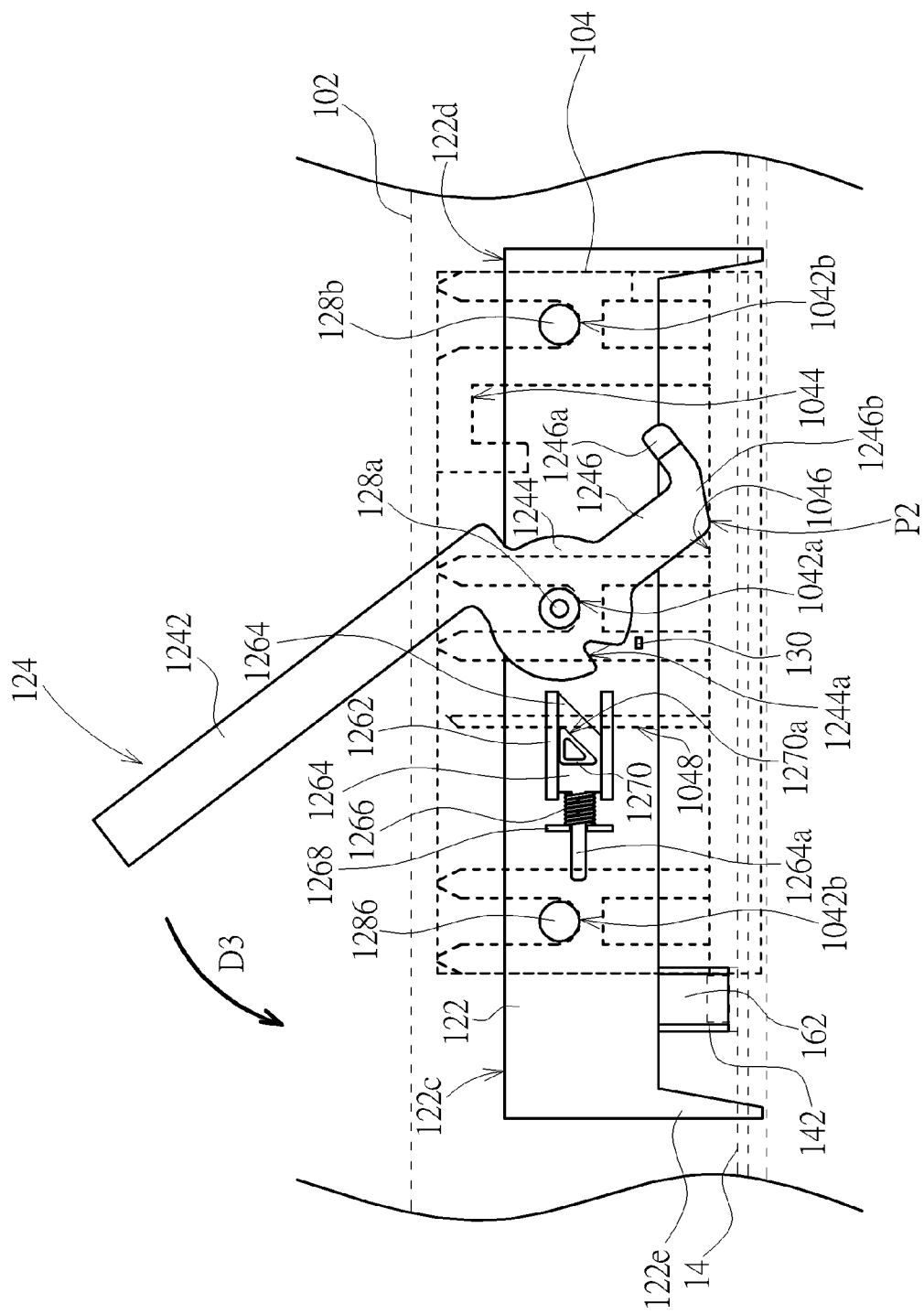
Figure 9:
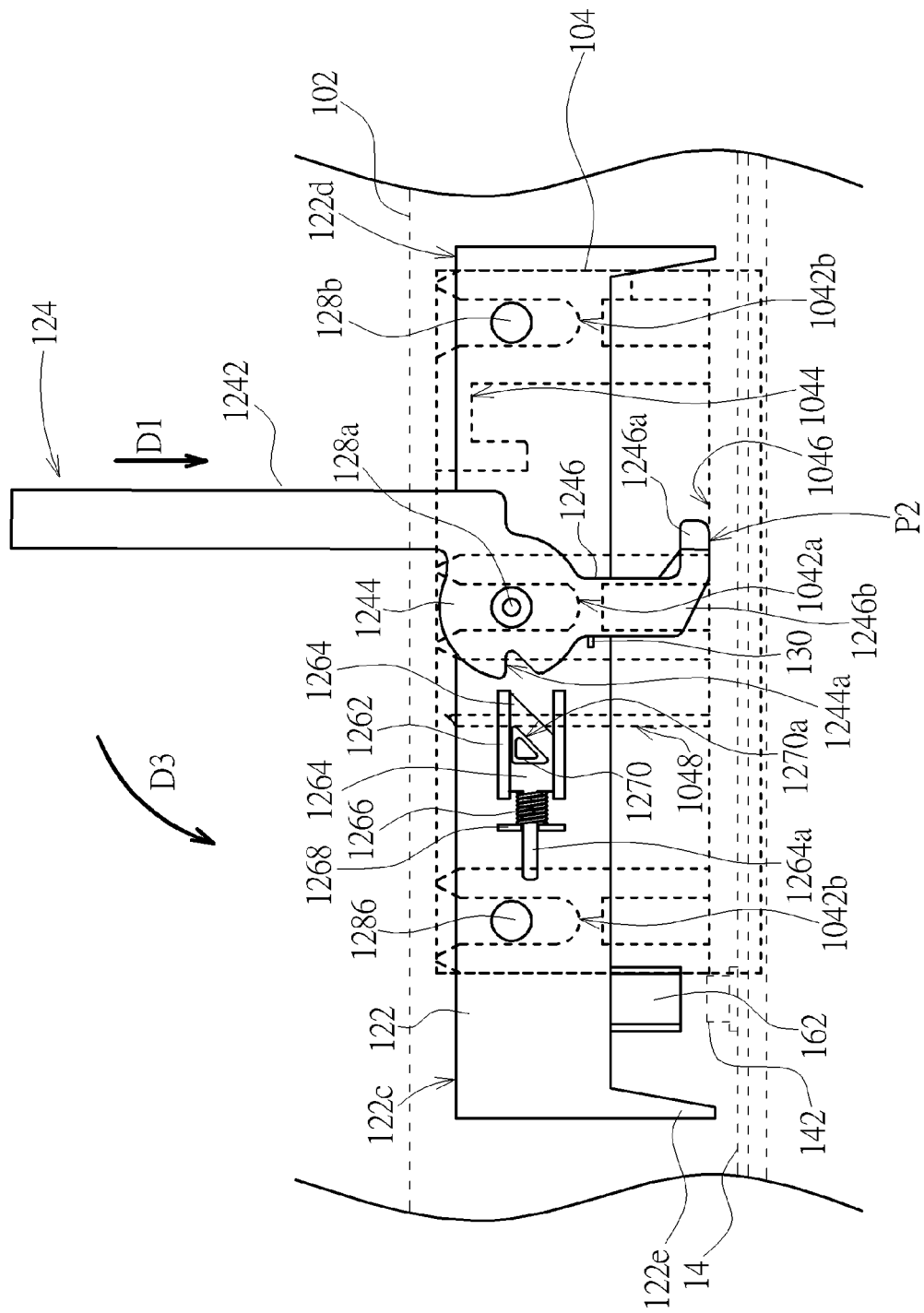

When the removable cage 12 is required to be extracted, the user can rotate the carry handle 124 away from the cage body 122 in the direction reverse to the rotation direction D3. The pushing part 1246 departs from the first constraint part 1044. The carry handle 124 is rotated continuously until the pushing part 1246 (or a lower end portion 1246b) pushes against the second constraint part 1046, as shown by FIG. 8. At this moment, the user can continue rotating the carry handle 124 in the direction reverse to the rotation direction D3. The carry handle 124 pivots about a contact point P2 as a fulcrum, where the pushing part 1246 contacts the second constraint part 1046, to move the cage body 122 in a direction reverse to the insertion direction D1 by the pivotally-connecting part 1244. The guide bosses 128a and 128b continue sliding in the slide slots 1042a and 1042b respectively until the handle body 1242 is vertical relative to the cage body 122, as shown by FIG. 9. At this moment, the electronic connectors 162 and 142 are disengaged, as shown by FIG. 9. In practice, when the handle body 1242 is vertical relative to the cage body 122, the disengagement of the electronic connectors 162 and 142 is not limited to the complete disengagement as shown by FIG. 9. In general, a holding force between connectors is provided mainly by structural constraint and resilient contacts after the connectors are engaged completely. Once the connectors are disengaged in a certain distance, the holding force has greatly decreased. A complete disengagement is unnecessarily. Therefore, in an application, the electronic connectors 162 and 142 can be designed to be partially disengaged to greatly decrease the holding force between the electronic connectors 162 and 142 when the handle body 1242 is vertical relative to the cage body 122. Such design also can achieve the effect of the invention. Afterwards, the user can vertically pull up the carry handle 124 in the direction reverse to the insertion direction D1. When the interference part 1048 departs from the oblique plane 1270a of the unlocking part 1270 (referring to FIG. 4), the resilient part 1266 drives the latching part 1264 to engage into the lock slot 1244a again so that the carry handle 124 is fixedly and vertically disposed relative to the cage body 122. In the embodiment, at this moment, the guide bosses 128a and 128b has been disengaged from the slide slots 1042a and 1042b; however, the invention is not limited thereto. Then, the user can entirely remove the removable cage 12 from the apparatus casing 10.

It is added that though the contact points P1 and P2 may move as the rotation angle of the carry handle 124 relative to the cage body 122, the contact points P1 and P2 still can perform the effect of lever fulcrum, which is well-known by skilled people in the art and will not be described herein. Furthermore, in the embodiment, the guiding effect between the first guiding structure 128 and the second guiding structure 1042 is achieved by use of the guide bosses 128a and 128b matching with the slide slots 1042a and 1042b; however, the invention is not limited thereto. For example, the guide bosses 128a and 128b and the slide slots 1042a and 1042b are reversely disposed on the apparatus casing 10 and the removable cage 12, or the whole structural profile of the cage body 122 is regarded as the first guiding structure with disposing another second guiding structure, which matches with this first guiding structure, on the apparatus casing 10. The both configuration can perform the guiding effect. In addition, in the embodiment, the carry handle 124 is pivotally connected to the two sides of the cage body 122 simultaneously, and the locking mechanisms 126 and the guiding structures 128 and 1042 are also disposed symmetrically, which is conducive to structural stability and operation convenience. However, the invention is not limited thereto.

As described above, the carry handle 124 of the removable cage 12 provides assistance in the insertion and extraction of the removable cage 12 by use of the principle of levers. Therefore, when the carry handle 124 is disposed to be vertical to the cage body 122, it presents that the installation of the removable cage 12 into the apparatus casing 10 is not completed yet, and the electronic connectors 162 and 142 are at an ineffectively electrically connected state or an unconnected state. Such design is convenient for the user to verify with bare eyes whether the removable cage 12 is installed completely. Furthermore, in the embodiment, the locking mechanism 126 is provided under an automatic locking design, so in principle, when the removable cage 12 departs from the apparatus casing 10, the carry handle 124 keeps vertical to the cage body 122. Such feature is conducive to carrying the removable cage 12 by the user during the transportation of the removable cage 12. Such feature is also conducive to aligning the first guiding structure 128 with the second guiding structure 1042 or applying a force to the cage body 122 through the carry handle 124 by the user during the installation of the removable cage 12 into the apparatus casing 10, which solves the problem of inconvenient insertion operation in the prior art. In addition, in the embodiment, the cage body 122 further includes four supporting legs 122e disposed at four corners of the cage body 122. In principle, the determination of the length of the supporting leg 122e depends on the requirement that the supporting legs 122e can support the cage body 122 on the bottom of the metal sheet casing 102 (or on other structural parts of the apparatus casing 10 or other components accommodated in the accommodating space 10a). When the removable cage 12 is removed from the apparatus casing 10, the supporting legs 122e are conducive to placing the removable cage 12 horizontally on a plane (e.g. a ground or a storage bracket) and can protect the electronic connectors 162 and the pushing part 1246.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A removable cage, capable of being installed in an apparatus casing, the apparatus casing comprising a first constraint part and a second constraint part, the removable cage comprising:
   a cage body for carrying an electronic module;
   a carry handle for carrying the cage body, the carry handle comprising a handle body, a pivotally-connecting part, and a pushing part, the handle body and the pushing part being oppositely connected to the pivotally-connecting part, the pivotally-connecting part being pivotally connected to the cage body, the pivotally-connecting part having a lock slot; and
   a locking mechanism disposed on the cage body, the locking mechanism comprising a latching part and an unlocking part, the latching part being capable of being engaged into lock slot so that the carry handle is fixed relative to the cage body for carrying the cage body, the unlocking part being dynamically connected to the latching part and capable of being driven to disengage the latching part from the lock slot;
   wherein when the removable cage is placed into the apparatus casing in an insertion direction, the unlocking part is driven to disengage the latching part from the lock slot so that the carry handle is capable of rotating toward a side of the cage body in a rotation direction and the pushing part pushes against the first constraint part, and the carry handle pivots about a fulcrum, where the pushing part contacts the first constraint part, to move the cage body in the insertion direction further by the pivotally-connecting part;
   wherein when the carry handle rotates away from the cage body in a direction reverse to the rotation direction, the pushing part departs from the first constraint part and pushes against the second constraint part, and the carry handle pivots about a fulcrum, where the pushing part contacts the second constraint part, to move the cage body in a direction reverse to the insertion direction by the pivotally-connecting part.

2. The removable cage of claim 1, wherein the locking mechanism comprises a resilient part, connected to the cage body and the latching part, for driving the latching part to engage into the lock slot so that the carry handle is fixed relative to the cage body for carrying the cage body.

3. The removable cage of claim 1, the apparatus casing comprising an interference part, wherein the unlocking part has an oblique plane, and when the removable cage is placed into the apparatus casing in the insertion direction, the interference part pushes against the oblique plane to drive the unlocking part to disengage the latching part from the lock slot.

4. The removable cage of claim 1, wherein the locking mechanism comprises a slide structure, a resilient part, and a constraint wall, the slide structure and the constraint wall are disposed on the cage body, the latching part is slidably disposed in the slide structure, the resilient part pushes against and between the latching part and the constraint wall, and the unlocking part is fixed on the latching part.

5. The removable cage of claim 1, further comprising a limitation structure disposed on the cage body, wherein when the latching part is disengaged from the lock slot, the limitation structure is capable of blocking the carry handle from rotating toward another side of the cage body in the direction reverse to the rotation direction.

6. The removable cage of claim 1, further comprising a first guiding structure disposed on the cage body, the apparatus casing comprising a second guiding structure matching with the first guiding structure, wherein when the removable cage is placed into the apparatus casing in the insertion direction, the second guiding structure is engaged with the first guiding structure to guide the cage body moving into the apparatus casing.

7. The removable cage of claim 6, wherein the first guiding structure comprises a guide boss disposed where the pivotally-connecting part and the cage body are pivotally connected, and when the removable cage is placed into the apparatus casing in the insertion direction, the guide boss slides in the second guiding structure.

8. An electronic apparatus, comprising:
an apparatus casing having an accommodating space, a first constraint part, and a second constraint part;
an electronic module; and
a removable cage, comprising:
  a cage body for carrying the electronic module;
  a carry handle for carrying the cage body, the carry handle comprising a handle body, a pivotally-connecting part, and a pushing part, the handle body and the pushing part being oppositely connected to the pivotally-connecting part, the pivotally-connecting part being pivotally connected to the cage body, the pivotally-connecting part having a lock slot; and
  a locking mechanism disposed on the cage body, the locking mechanism comprising a latching part and an unlocking part, the latching part being capable of being engaged into lock slot so that the carry handle is fixed relative to the cage body for carrying the cage body, the unlocking part being dynamically connected to the latching part and capable of being driven to disengage the latching part from the lock slot;
wherein when the removable cage is placed into the accommodating space in an insertion direction, the unlocking part is driven to disengage the latching part from the lock slot so that the carry handle is capable of rotating toward a side of the cage body in a rotation direction and the pushing part pushes against the first constraint part, and the carry handle pivots about a fulcrum, where the pushing part contacts the first constraint part, to move the cage body in the insertion direction further by the pivotally-connecting part;
wherein when the carry handle rotates away from the cage body in a direction reverse to the rotation direction, the pushing part departs from the first constraint part and pushes against the second constraint part, and the carry handle pivots about a fulcrum, where the pushing part contacts the second constraint part, to move the cage body in a direction reverse to the insertion direction by the pivotally-connecting part.

9. The electronic apparatus of claim 8, wherein the locking mechanism comprises a resilient part, connected to the cage body and the latching part, for driving the latching part to engage into the lock slot so that the carry handle is fixed relative to the cage body for carrying the cage body.

10. The electronic apparatus of claim 8, wherein the apparatus casing comprises an interference part, the unlocking part has an oblique plane, and when the removable cage is placed into the accommodating space in the insertion direction, the interference part pushes against the oblique plane to drive the unlocking part to disengage the latching part from the lock slot.

11. The electronic apparatus of claim 10, wherein the interference part is a rib extending in the insertion direction.

12. The electronic apparatus of claim 8, wherein the locking mechanism comprises a slide structure, a resilient part, and a constraint wall, the slide structure and the constraint wall are disposed on the cage body, the latching part is slidably disposed in the slide structure, the resilient part pushes against and between the latching part and the constraint wall, and the unlocking part is fixed on the latching part.

13. The electronic apparatus of claim 8, wherein the removable cage further comprises a limitation structure disposed on the cage body, and when the latching part is disengaged from the lock slot, the limitation structure is capable of blocking the carry handle from rotating toward another side of the cage body in the direction reverse to the rotation direction.

14. The electronic apparatus of claim 8, wherein the removable cage further comprises a first guiding structure disposed on the cage body, the apparatus casing comprises a second guiding structure matching with the first guiding structure, and when the removable cage is placed into the apparatus casing in the insertion direction, the second guiding structure is engaged with the first guiding structure to guide the cage body moving into the apparatus casing.

15. The electronic apparatus of claim 14, wherein the first guiding structure comprises a guide boss disposed where the pivotally-connecting part and the cage body are pivotally connected, the second guiding structure comprises a slide slot, and when the removable cage is placed into the accommodating space in the insertion direction, the guide boss slides in the slide slot.

16. The electronic apparatus of claim 8, further comprising a first electronic connector, the electronic module comprising a second electronic connector, the first electronic connector being disposed on the apparatus casing, the second electronic connector being exposed out of the cage body, wherein when the carry handle pivots about a fulcrum, where the pushing part contacts the first constraint part, to move the cage body in the insertion direction further by the pivotally-connecting part, the first electronic connector and the second electronic connector are capable of being engaged with each other completely.

* * * * *